United States Patent [19]

Schweizer

[11] 4,079,979
[45] Mar. 21, 1978

[54] RECORD GRASPING APPARATUS

[76] Inventor: Eduard Hansjorg Schweizer, 5101 Boarshead Rd., Minnetonka, Minn. 55343

[21] Appl. No.: 736,471

[22] Filed: Oct. 28, 1976

[51] Int. Cl.² .............................................. B65G 7/12
[52] U.S. Cl. ....................................... 294/33; 294/16
[58] Field of Search ................. 294/33, 16, 1 R, 99 R, 294/106; 24/255 R, 255 BS, 255 FC, 255 TZ; 224/45 K; 274/1 R, 1 J

[56] References Cited
U.S. PATENT DOCUMENTS

| 3,410,592 | 11/1968 | Schweizer | 294/33 |
| 3,558,169 | 1/1971 | Onanian | 294/16 |

Primary Examiner—James D. Marbert
Attorney, Agent, or Firm—Wicks & Nemer

[57] ABSTRACT

Record grasping apparatus is shown in its preferred form as including first and second grasping and protecting members held in a spaced relation by a spacer member allowing the deflection of the grasping and protecting members together for grasping the record. In the preferred embodiment, the first grasping and protecting member includes an extension member for wedging beneath the record and allowing the insertion of the first grasping and protecting member beneath the record. The second grasping and protecting member, in the preferred embodiment, includes a partially removed and upturned edge to prevent the edge from engaging the record at a single point. The spacer member is shown, in its preferred form, as slide interconnect members formed on the first and second grasping and protecting members.

25 Claims, 7 Drawing Figures

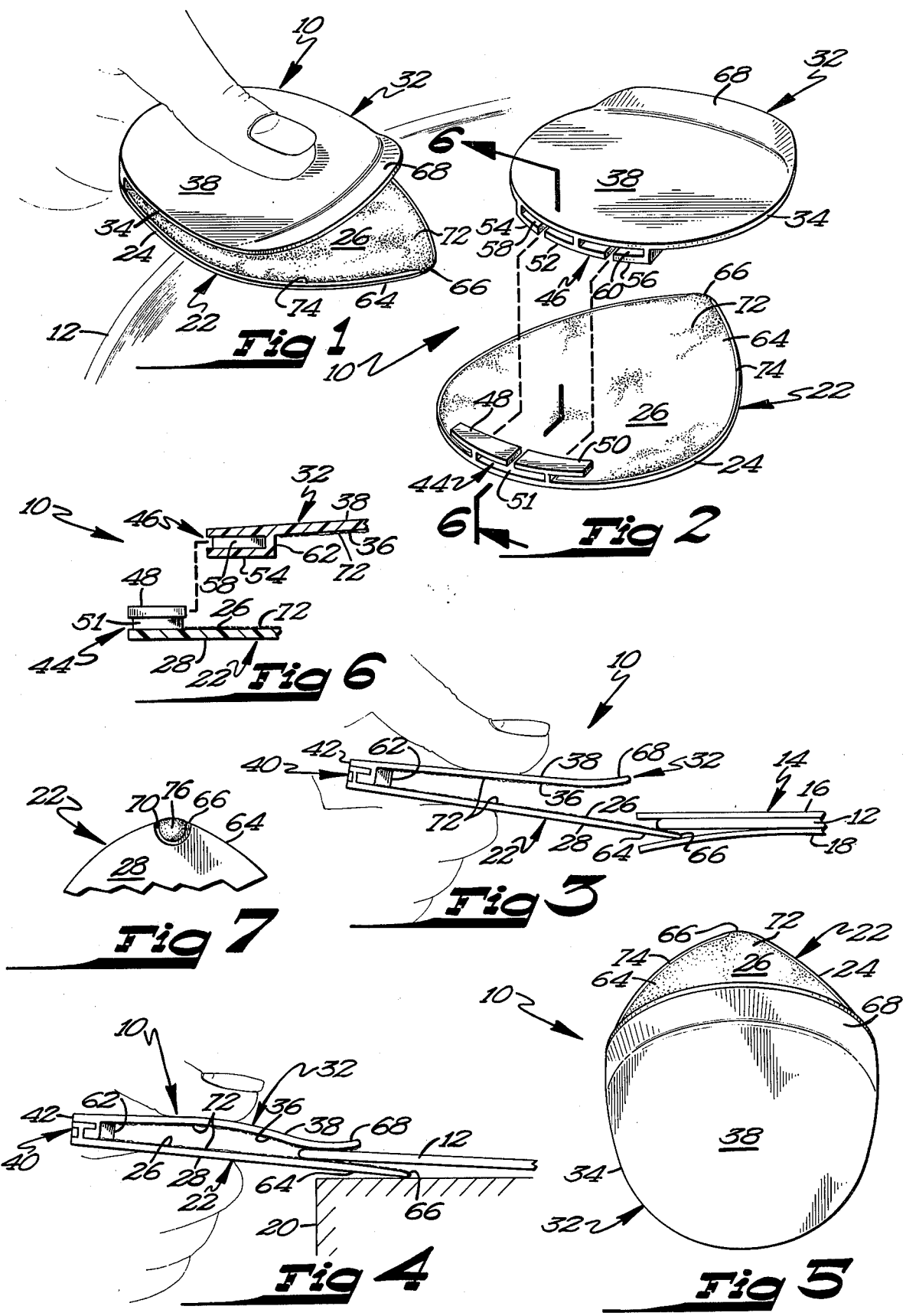

RECORD GRASPING APPARATUS

BACKGROUND

The present invention relates generally to apparatus for grasping records.

With the increasing use of stereophonic and other recorded media equipment, persons have an increasing awareness of the care and preservation of the recorded medium in the form of delicate phonograph records. Removing a record from its sleeve and jacket or from a turntable by hand without contaminating its delicate surface is an almost impossible task. The fingers carry body acids, liquids, fats, microorganisms, and other pollutants which contaminate the grooves of records they come in contact with. Additionally, the fingernails are often times the source of physical damage and scratches to the records.

Previous apparatus known in the art suffered severe limitations in extracting records from their jackets or removing records from a turntable. Further, the grasping members of previous apparatus were ultrasonically interconnected which was expensive and resulted in apparatus having nonuniform spacing among the product line. Therefore, previous apparatus present serious limitations and deficiencies in the care and preservation of delicate phonograph records.

SUMMARY

The present invention solves these and other problems in record grasping apparatus by providing, in the preferred embodiment, first and second grasping and protecting means held in a spaced relation by third means allowing the first and second means to be deflected toward each other for grasping the record therebetween, with the first means including fourth means for wedging beneath the record and allowing the insertion of the first means beneath the record for better grasping and moving the record without damaging or contaminating the record.

In the preferred embodiment, the third means comprises first and second members formed on the first and second means for slidably interconnecting with each other.

Therefore, it is thus a primary object of the present invention to provide novel record grasping apparatus.

It is further an object of the present invention to provide such record grasping apparatus including means for better removing a record from its jacket or a turntable without damage to the record.

It is further an object of the present invention to provide such record grasping apparatus which is of simple design, easy to use, maximizes the materials used, and is less damaging to records than heretofore.

It is further an object of this invention to provide such record grasping apparatus having uniform spacing among the product line.

It is further an object of this invention to provide such record grasping apparatus which can be easily manufactured at a low cost in time, materials, and labor.

These and further objects and advantages of the present invention will become clearer in light of the following detailed description of an illustrative embodiment of this invention described in connection with the drawings.

DESCRIPTION OF THE DRAWINGS

The illustrative embodiment may best be described by reference to the accompanying drawings where:

FIG. 1 shows a perspective view of record grasping apparatus according to the teachings of the present invention.

FIG. 2 shows an exploded perspective view of the apparatus of FIG. 1.

FIG. 3 shows a side view of the apparatus of FIG. 1 in the process of removing a record from its jacket.

FIG. 4 shows a side view of the apparatus of FIG. 1 in the process of removing a record from a turntable.

FIG. 5 shows a top view of the apparatus of FIG. 1.

FIG. 6 shows a cross sectional view of the apparatus of FIG. 1 according to section line 6—6 of FIG. 2.

FIG. 7 shows a partial bottom view of the apparatus of FIG. 1.

All figures are drawn for ease of explanation of the basic teachings of the present invention only, the extensions of the figures with respect to number, position, relationship, and dimensions of the parts to form the preferred embodiment will be explained or be obvious from the explanation set out.

DESCRIPTION

In the figures, apparatus for grasping phonograph records, according to the teachings of the present invention, is shown and generally designated 10. Disc 12 having a recorded media thereon may be of any of the known types, and specifically may be of the vinyl, stereophonic, phonograph record type. Record 12, as known in the art and as best seen in FIG. 3, is stored in a jacket or album cover 14 having an upper cover 16 and a lower cover 18. Further, jacket 14 can further include a sleeve, not shown, for receiving record 12. Record 12 removed from jacket 14 can also be placed on turntable 20 for playing, as is well known in the art.

Apparatus 10 then includes a first member 22 for grasping and protecting record 12. First member 22, preferably disc-like, includes edge 24 defining an area and including a first surface 26 and a second surface 28.

Apparatus 10 further includes a second member 32 for grasping and protecting record 12. Second member 32, preferably disc-like, includes edge 34 defining an area and including a first surface 36 and a second surface 38.

Apparatus 10 further includes a third member 40 located at a point 42 adjacent edges 24 and 34 of members 22 and 32 for holding member 32 in a spaced relation from first member 22 for allowing members 22 and 32 to be deflected toward each other for grasping record 12 between first surfaces 26 and 36 of members 22 and 32. In the preferred form, third member 40 includes a first type of slide interconnect member 44 formed on first surface 26 of member 22 and includes a second type of slide interconnect member 46 formed on first surface 36 of member 32 having a shape complementary to first slide interconnect member 44 such that first slide interconnect member 44 is able to be slidably interconnected with second slide interconnect member 46.

In the preferred embodiment, slide interconnect member 44 is formed of a first T-shaped member 48 and a second T-shaped member 50 upstanding from first surface 26 and, in the preferred form, formed integrally with first member 22 and upstanding from surface 26. In the preferred embodiment, slide interconnect member 46 is formed from a third T-shaped member 52, a first L-shaped member 54, and a second L-shaped member 56 upstanding from first surface 36 and, in the preferred form, formed integrally with second member 32 and upstanding from surface 36. It should be noted that L-shaped member 54 and T-shaped member 52 form a first T-shaped cavity 58 having a shape complementary to and slidably receiving T-shaped member 48 and that L-shaped member 56 and T-shaped member 52 form a second T-shaped cavity 60 having a shape complementary to and slidably receiving T-shaped member 50. It should further be noted that member 48 and member 50 form a third T-shaped cavity 51 having a shape complementary to and slidably receiving T-shaped member 52. Slide interconnect member 46 may further include a wall member 62, as best seen in FIG. 6, for preventing slide interconnect member 44 from sliding through slide interconnect member 46.

First member 22 includes a fourth member 64 located opposite of point 42 of third member 40 for wedging beneath record 12 located in jacket 14, as best seen in FIG. 3, or on turntable 20, as best seen in FIG. 4, or other like situations, and for allowing insertion of member 22 such that record 12 can be located between first surfaces 26 and 36 of members 22 and 32, respectively. In the preferred form, member 64 comprises an extension member or lip member formed integrally with surface 26 of first member 22. Member 64 then includes an insertion point 66 having an indented cavity 70 formed on surface 28, as best seen in FIG. 7, for purposes explained further hereinafter.

Apparatus 10 further includes a partially removed and upturned edge portion 68 formed on edge 34 of member 32, opposite from point 42 of third member 40 and coinciding with fourth member 64 to prevent edge 34 from engaging record 12 at a single point and thus possibly damaging record 12.

It should then be noted that, in the preferred embodiment, members 22, 32, 44, and 64 are formed from plastic material. Further, it should be noted that surfaces 26 and 36 of members 22 and 32, respectively, include a soft record handling material 72 such as velvet for engaging the record and thus protecting the record from any rough surfaces which may scratch the record. A protective edge 74 can be located on surfaces 26 and 36 of members 22 and 32 around the perimeter of material 72.

Records 12 known in the art vary in thickness from between 1 millimeter to 8 millimeters and have rounded perimeter edges as best seen in FIGS. 3 and 4. Prior known apparatus, before the present invention, included grasping and protecting members of a thickness approximately equal to or greater than 2.5 millimeters. Therefore, such prior apparatus had difficulty in being wedged under the edge of the record, especially when the record was located on a turntable.

It should then be noted that the thickness of members 64 gradually decreased from a thickness equal to the thickness of member 22 to a lesser thickness at the insertion point 66 allowing point 66 to be wedged beneath record 12. Specifically, the thickness of insertion point 66 is approximately equal to 1 millimeter. It should further be noted that protective edge 74 is partially broken away at insertion point 66 to minimize the thickness thereof. Likewise, it should be noted that material 72 located on member 64 includes a tab member 76 which is wrapped around edge 24 at point 66 of member 22 and adhesively secured to surface 28 within indented cavity 70. Therefore, the thickness of insertion point 66 is minimized in that the thickness is reduced by the thickness of material 72 in that tab member 76 is located within cavity 70.

Additionally, it should be noted that since tab member 76 is wrapped around point 66, point 66 will not scratch or otherwise damage the record when point 66 is being wedged beneath record 12 in that material 72 protects record 12 from any rough points or surfaces of point 66.

It should then also be noted that, during the manufacturing process, member 44 may be slidably interconnected with member 46. Specifically, member 48 may be slidably received within cavity 58, member 50 slidably received within cavity 60, and member 52 slidably received within cavity 51. Thus apparatus 10 is intended to be sold to the intended user in its assembled relation and not intended to be dissembled by the user during its normal use.

As best seen in FIGS. 1, 3, and 4, in use, apparatus 10 may be grasped between the thumb and first finger of the hand of the user. As best seen in FIG. 3, for removing record 12 from jacket 14, the user can first insert point 66 of apparatus 10 inside jacket 14. Due to its reduced thickness, point 66 is then moved upon the upper surface of lower cover 18 and wedged beneath record 12 and between cover 18 and record 12, thus allowing the further insertion of point 66 of apparatus 10 within jacket 18. It should then be noted that upon its further insertion, edge 68 encounters upper cover 16 of jacket 14. At that time, the user can press down upon member 32 of apparatus 10, thus deflecting member 32 towards member 22 of apparatus 10, such that edge 68 is located beneath the inside surface of upper cover 16 and edge 68 slides upon the inside surface of cover 16. At that time, the user can allow member 32 to separate from member 22 of apparatus 10 thereby separating upper cover 16 from lower cover 18. Also at that time, apparatus 10 can be further inserted into jacket 14 until record 12 is located between first surface 26 of member 22 and first surface 36 of member 32. The user can then again deflect member 32 toward member 22 such that record 12 can be securely grasped between first surfaces 26 and 36 of members 22 and 32, as best seen in FIG. 1. Record 12 can then be withdrawn from jacket 14.

It should be noted that, for inserting record 12 into jacket 14, the aforementioned method for withdrawal can be reversed.

As best seen in FIG. 4, record 12 can also be removed from a turntable 20 by using the present invention, as by the following method. First, due to its reduced thickness, point 66 can be wedged beneath record 12 and between turntable 20 and record 12 such that point 66 can be slid upon the top surface of turntable 20 thus allowing the insertion of point 66 beneath record 12. Point 66 can then be slid beneath record 12 upon top surface of turntable 20 until record 12 is located between surfaces 26 and 36 of members 22 and 32, respectively. At that time, the user can deflect member 32 toward first member 22, thus grasping record 12 between surfaces 26 and 36 of member 22 and 32 as shown in FIG. 1.

Record 12 can also be placed upon turntable 20 by reversing the aforementioned method of removing record 12 from turntable 20.

It should then be noted that, with use of the present invention, the fingers of the user do not contact the surfaces of record 12. Therefore, apparatus 10 prevents the body acids, liquids, fats, microorganisms, and other pollutants carried by the fingers of the user from contaminating the record. Additionally, apparatus 10 prevents the fingers of the user from contacting the record and thus prevents physical damage and scratches thereto, as from fingernails.

Likewise, tab member 76 prevents point 66 from scratching or othewise damaging record 12 during insertion of point 66 beneath record 12 and material 72 prevents surfaces 26 and 36 from scratching or othewise damaging record 12 when record 12 is located between surfaces 26 and 36.

Now that the basic teachings of the present invention have been explained, many extensions and variations will be obvious to one having ordinary skill in the art. For example, although apparatus 10 is shown in the preferred embodiment as including member 40, member 64, and edge 68 in a single apparatus, apparatus 10 according to the present invention can include one or more of these members.

Thus, since the invention disclosed herein may be embodied in other specific forms without departing from the spirit or the general characteristics thereof, some of which forms have been indicated, the embodiments described herein are to be considered in all respects illustrative and not restrictive. The scope of the invention is indicated by the appended claims, rather than by the foregoing description and all changes which come within the meaning and range of equivalency of the claims are intended to be embraced therein.

What is claimed is:

1. Apparatus for grasping records comprising, in combination: first means for grasping and protecting records including an edge defining an area and including a first surface and a second surface; second means for grasping and protecting records including an edge defining an area and including a first surface and a second surface; third means for holding the second means in a spaced relation from the first means for allowing the first and second means to be deflected toward each other for grasping the record between the first surfaces of the first and second means, with the first means including fourth means located opposite the third means for wedging beneath the record and allowing the insertion of the first means beneath the record, with the fourth means including an insertion point, with the first surfaces of the first and second means further including soft, record handling material for engaging and protecting the record, and with the record handling material located on the first means including a tab member wrapped around the edge of the first means at the insertion point to prevent the insertion point from scratching or otherwise damaging the record when the fourth means is wedged beneath the record such that the record can be located between the first surfaces of the first and second means for better grasping and moving the record without damaging or contaminating the record.

2. The apparatus of claim 1 wherein the fourth means comprises, in combination: an extension member formed integrally with the first means.

3. The apparatus of claim 2 wherein the extension member has a gradually decreasing thickness from a thickness equal to the thickness of the first means to a thickness approximately equal to 1 millimeter.

4. The apparatus of claim 3 further comprising an indented cavity formed on the second surface of the first means at the insertion point for further minimizing the thickness of the insertion point.

5. The apparatus of claim 4 wherein the third means comprises, in combination: first slide interconnect member formed on the first surface of the first means; and second slide interconnect member having a shape complementary to the first slide interconnect member formed on the first surface of the second means wherein the first slide interconnect member may be slidably interconnected with the second slide interconnect member.

6. The apparatus of claim 5 wherein the first slide interconnect member comprises, in combination, a first T-shaped member and a second T-shaped member upstanding from the first surface of the first means and wherein the second slide interconnect member comprises, in combination, a third T-shaped member, a first L-shaped member, and a second L-shaped member upstanding from the first surface of the second means, with the first L-shaped member and the third T-shaped member forming a first T-shaped cavity having a shape complementary to and for slidably receiving the first T-shaped member, with the second L-shaped member and the third T-shaped member forming a second T-shaped cavity having a shape complementary to and for slidably receiving the second T-shaped member, and with the first and second T-shaped members forming a third T-shaped cavity having a shape complementary to and for slidably receiving the third T-shaped member.

7. The apparatus of claim 4 wherein the edge of the second means is partially removed and upturned at a location opposite of the third means and coinciding with the fourth means to prevent the edge from engaging the record at a single point thus possibly damaging the record.

8. The apparatus of claim 1 wherein the third means comprises, in combination: first slide interconnect member formed on the first surface of the first means; and second slide interconnect member having a shape complementary to the first slide interconnect member formed on the first surface of the second means wherein the first slide interconnect member may be slidably interconnected with the second slide interconnect member.

9. The apparatus of claim 8 wherein the first slide interconnect member comprises, in combination, a first T-shaped member and a second T-shaped member upstanding from the first surface of the first means and wherein the second slide interconnect member comprises, in combination, a third T-shaped member, a first L-shaped member, and a second L-shaped member upstanding from the first surface of the second means, with the first L-shaped member and the third T-shaped member forming a first T-shaped cavity having a shape complementary to and for slidably receiving the first T-shaped member, with the second L-shaped member and the third T-shaped member forming a second T-shaped cavity having a shape complementary to and for slidably receiving the second T-shaped member, and with the first and second T-shaped members forming a third T-shaped cavity having a shape complementary to and for slidably receiving the third T-shaped member.

10. The apparatus of claim 1 wherein the edge of the second means is partially removed and upturned at a location opposite of the third means and coinciding with the fourth means to prevent the edge from engaging the record at a single point thus possibly damaging the record.

11. The apparatus of claim 1 further comprising an indented cavity formed on the second surface of the first means at the insertion point for minimizing the thickness of the insertion point.

12. Apparatus for grasping records comprising, in combination: first means for grasping and protecting records including an edge defining an area and including a first surface and a second surface; second means for grasping and protecting records including an edge defining an area and including a first surface and a second surface; third means for holding the second means in a spaced relation from the first means for allowing the first and second means to be deflected toward each other for grasping the record between the first surfaces of the first and second means such that the record can be located between the first surfaces of the first and second means for better grasping and moving the record without damaging or contaminating the record, with the third means comprising, in combination: first slide interconnect member formed on the first surface of the first means; and second slide interconnect member having a shape complementary to the first slide interconnect member formed on the first surface of the second means wherein the first slide interconnect member may be slidably interconnected with the second slide interconnect member.

13. The apparatus of claim 12 wherein the first slide interconnect member comprises, in combination, a first T-shaped member and a second T-shaped member upstanding from the first surface of the first means and wherein the second slide interconnect member comprises, in combination, a third T-shaped member, a first L-shaped member, and a second L-shaped member upstanding from the first surface of the second means, with the first L-shaped member and the third T-shaped member forming a first T-shaped cavity having a shape complementary to and for slidably receiving the first T-shaped member, with the second L-shaped member and the third T-shaped member forming a second T-shaped cavity having a shape complementary to and for slidably receiving the second T-shaped member, and with the first and second T-shaped members forming a third T-shaped cavity having a shape complementary to and for slidably receiving the third T-shaped member.

14. The apparatus of claim 12 wherein the first means includes fourth means located opposite the third means for wedging beneath the record and allowing the insertion of the first means beneath the record.

15. The apparatus of claim 14 wherein the fourth means includes an insertion point, and wherein the first surfaces of the first and second means further include soft, record handling material for engaging and protecting the record, with the record handling material located on the first means including a tab member wrapped around the edge of the first means at the insertion point to prevent the insertion point from scratching or othewise damaging the record when the fourth means is wedged beneath the record.

16. The apparatus of claim 15 further comprising an indented cavity formed on the second surface of the first means at the insertion point for minimizing the thickness of the insertion point.

17. The apparatus of claim 15 wherein the fourth means has a gradually decreasing thickness from a thickness equal to the thickness of the first means to a thickness approximately equal to 1 millimeter.

18. The apparatus of claim 14 wherein the edge of the second means is partially removed and upturned at a location opposite of the third means and coinciding with the fourth means to prevent the edge from engaging the record at a single point thus possibly damaging the record.

19. Apparatus for grasping records comprising, in combination: first means for grasping and protecting records including an edge defining an area and including a first surface and a second surface; second means for grasping and protecting records including an edge defining an area and including a first surface and a second surface; third means for holding the second means in a spaced relation from the first means for allowing the first and second means to be deflected toward each other for grasping the record between the first surfaces of the first and second means such that the record can be located between the first surfaces of the first and second means for better grasping and moving the record without damaging or contaminating the record, with the edge of the second means being partially removed and upturned at a location opposite of the third means to prevent the edge from engaging the record at a single point thus possibly damaging the record.

20. The apparatus of claim 19 wherein the first means includes fourth means located opposite the third means for wedging beneath the record and allowing the insertion of the first means beneath the record, with the edge of the second means which is partially removed and upturned being at a location coinciding with the fourth means.

21. The apparatus of claim 20 wherein the fourth means includes an insertion point, and wherein the first surfaces of the first and second means further include soft, record handling material for engaging and protecting the record, with the record handling material located on the first means including a tab member wrapped around the edge of the first means at the insertion point to prevent the insertion point from scratching or otherwise damaging the record when the fourth means is wedged beneath the record.

22. The apparatus of claim 21 further comprising an indented cavity formed on the second surface of the first means at the insertion point for minimizing the thickness of the insertion point.

23. The apparatus of claim 21 wherein the fourth means has a gradually decreasing thickness from a thickness equal to the thickness of the first means to a thickness approximately equal to 1 millimeter.

24. The apparatus of claim 19 wherein the third means comprises, in combination: first slide interconnect member formed on the first surface of the first means; and second slide interconnect member having a shape complementary to the first slide interconnect member formed on the first surface of the second means wherein the first slide interconnect member may be slidably interconnected with the second slide interconnect member.

25. The apparatus of claim 24 wherein the first slide interconnect member comprises, in combination, a first T-shaped member and a second T-shaped member upstanding from the first surface of the first means and wherein the second slide interconnect member comprises, in combination, a third T-shaped member, a first L-shaped member, and a second L-shaped member upstanding from the first surface of the second means, with the first L-shaped member and the third T-shaped member forming a first T-shaped cavity having a shape complementary to and for slidably receiving the first T-shaped member, with the second L-shaped member and the third T-shaped member forming a second T-shaped cavity having a shape complemetary to and for slidably receiving the second T-shaped member, and with the first and second T-shaped members forming a third T-shaped cavity having a shape complementary to and for slidably receiving the third T-shaped member.

* * * * *